United States Patent [19]

McCollum et al.

[11] 4,229,713
[45] Oct. 21, 1980

[54] STOICHIOMETRIC RARE EARTH LASER MATERIAL AND LASER BASED THEREON

[75] Inventors: Bill C. McCollum, Marlborough; Alexander Lempicki, Wayland, both of Mass.

[73] Assignee: GTE Laboratories Incorporated, Waltham, Mass.

[21] Appl. No.: 970,054

[22] Filed: Dec. 14, 1978

[51] Int. Cl.³ .............................................. H01S 3/14
[52] U.S. Cl. .............................................. 331/94.5 F
[58] Field of Search .............................. 331/94.5 F; 252/301.4 H

[56] References Cited
PUBLICATIONS

"Miniature Neodymium Lasers as Optical Transmitters: Requirements Relating to Material Selection, Laser Properties and LED Pumping", by Krühler et al., Springer-Verlag 1978, pp. 291-297.

"Nd Min Lasers Based on Stoichiometric Rare Earth Compounds," Lempicki et al.

Primary Examiner—William L. Sikes
Assistant Examiner—León Scott, Jr.
Attorney, Agent, or Firm—Jerry F. Janssen

[57] ABSTRACT

A high gain stoichiometric neodymium laser medium of the general formula $K_5Nd_xM_{(1-x)}Li_2F_{10}$ where x takes on a non-zero positive value less than or equal to one, and M is a metal selected from the group consisting of lanthanum, cerium, and gadolinium.

Minilasers employing a laser medium of the general formula $K_5Nd_xM_{(1-x)}Li_2F_{10}$ are provided in which the optical pumping is provided by at least one light emitting diode or laser diode.

15 Claims, 6 Drawing Figures

STOICHIOMETRIC RARE EARTH LASER MATERIAL AND LASER BASED THEREON

The invention herein described was made in the course of or under a contract or subcontract thereunder with the Department of the Army.

BACKGROUND OF THE INVENTION

This invention relates to lasers. More particularly, it is concerned with stoichiometric single crystal neodymium fluoride compounds useful as lasing media and with lasers employing such media.

There has been considerable recent interest in attempts to produce miniature lasers which utilize stoichiometric neodymium compounds as the active laser media. These efforts have been reviewed by S. R. Chinn et al. in *Laser Focus*, pp. 64–69, May, 1976, and by H. G. Danielmeyer in *Festkörperprobleme*, 15:253 (1975). U.S. Pat. Nos. 4,000,247 to Yamada et al. and 3,813,613 to Danielmeyer et al. disclose, respectively, neodymium meta- and ultraphosphate laser media and lasers based on these materials.

The laser media discussed in the prior art are, for the most part, drawn from the classes of meta- and ultra-phosphates, borates, and tungstates of neodymium. These materials are all examples of stoichiometric neodymium laser media; that is, materials in which neodymium forms one component of a stoichiometric formulation rather than merely a dopant.

These stoichiometric laser materials permit the construction of miniature lasers (minilasers) because of the high concentration of active lasing sites per unit volume of the crystal. The neodymium concentration in $NdP_5O_{14}$, for example, is $4.0 \times 10^{21}$ ions $cm^{-3}$, roughly 30 times that found in conventional neodymium-doped yttrium aluminum garnet (Nd:YAG). The high density of neodymium sites in stoichiometric laser materials causes laser pump radiation to be absorbed over short distances within the crystal, typically within 100 micrometers. This in turn allows for the use of small crystals for the lasting medium, permitting the overall dimensions of the laser to be kept to a minimum. The potential applications for such minilasers in the fields of optical communications, hand-held laser ranging devices, target designators and the like, is obvious.

To be effective as a high gain stoichiometric neodymium laser medium, a material should first possess appreciable deviation from inversion symmetry at the neodymium sites in the crystal. There is a decrease in fluorescence cross-section, and therefore gain, if the ions are situated at sites possessing inversion symmetry. Second, it is important that, while maximizing neodymium ion concentration in the material, as large a separation between adjacent lasing ion sites be maintained as possible. Self-quenching of the luminescence efficiency increases with decreasing intersite separation, in turn decreasing the laser gain.

In the stoichiometric neodymium laser materials described in the prior art, intersite separation of adjacent neodymium ions is accomplished by the incorporation of an oxygen-containing anion such as phosphate, borate, or tungstate. However, reasonably strong interactions between adjacent neodymium sites in these materials contribute to radiationless energy losses which, in some cases, may become appreciable. Thus, for example, in neodymium pentaphosphate, the luminescence lifetime decreases by a factor of almost 3 when neodymium ion concentration is increased from dilute to stoichiometric.

OBJECTS OF THE INVENTION

It is therefore an object of the present invention to provide stoichiometric neodymium laser materials in which the concentration of neodymium ions is maximized while maintaining large intersite separation.

It is a further object of this invention to provide stoichiometric neodymium laser materials in which there are no contiguous neodymium ion sites, and in which the separation between neodymium ion near neighbors is greater than that in prior art materials.

It is still a further object of this invention to provide stoichiometric neodymium laser materials in which the separation of adjacent neodymium ions is achieved without the use of an oxygen-containing anion.

It is a still further object of the invention to provide stoichiometric neodymium laser materials in which concentration quenching is minimized.

SUMMARY OF THE INVENTION

Single crystal active laser media according to the present invention comprise a compound of the general formula $K_5Nd_xM_{(1-x)}Li_2F_{10}$ where x takes any value greater than zero, but less than or equal to one. Preferred values of x range between 0.01 and 1. M is a metal selected from the group consisting of lanthanum, cerium, and gadolinium. A particularly desirable laser material according to the present invention is $K_5NdLi_2F_{10}$.

Lasers in accordance with the present invention comprise an optical resonance cavity defined by a first totally reflective mirror and a second partially transmissive mirror; an active laser medium comprising a single crystal of a compound of the general formula $K_5Nd_xM_{(1-x)}Li_2F_{10}$ ($0 < x \leq 1$, M = La, Ce, or Gd) disposed within the cavity; and an optical pumping means disposed adjacent to the cavity for exciting the laser medium to emit stimulated radiation.

Figure 1:
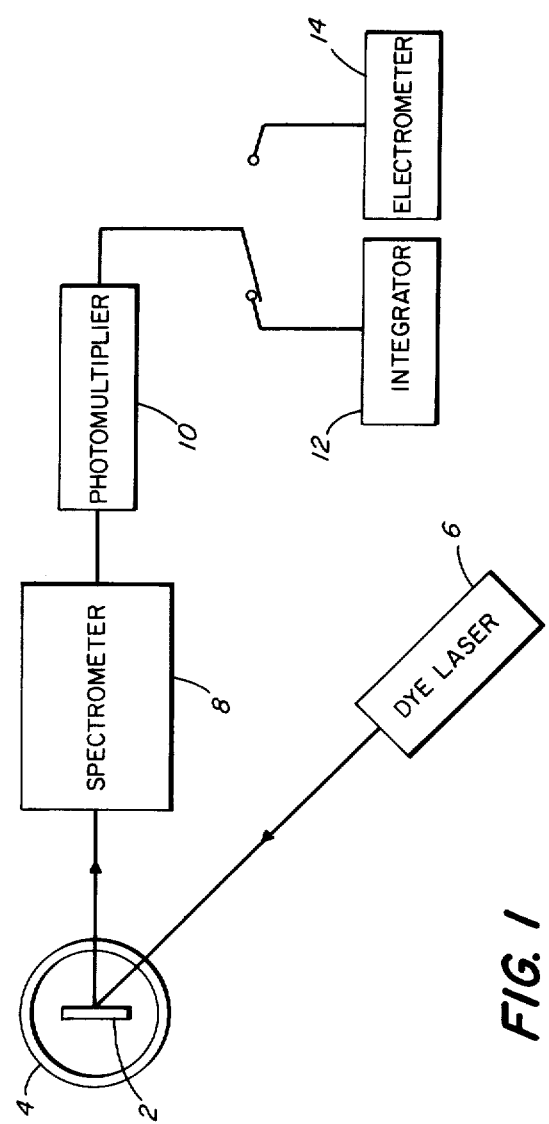
FIG. 1 is a schematic representation of the experimental arrangement employed to determine the spectroscopic properties of laser media according to the present invention.

For a better understanding of the present invention, together with other and further objects, advantages, and capabilities thereof, reference is made to the following disclosure and appended claims in connection with the above-described drawing.

DETAILED DESCRIPTION

Stoichiometric neodymium-based rare earth laser media are formed of compounds having the general formula $K_5Nd_xM_{(1-x)}Li_2F_{10}$ where M can be lanthanum, cerium, or gadolinium and x takes on a positive non-zero value less than or equal to one. In the case where $x=1$, the optimum laser material according to the present invention, $K_5NdLi_2F_{10}$ (referred to hereinafter as KNLF), is formed. The details for the preparation of KNLF are given in Example I below.

KNLF belongs to the Pnma space group and X-ray diffraction structure determination shows the unit cell to be orthorhombic with lattice parameters $a=20.65$ Å, $b=7.78$ Å, and $c=6.90$ Å. The neodymium ion concentration of this material is $3.6 \times 10^{21}$ ions $cm^{-3}$ which is nearly equal to that of neodymium pentaphosphate, the best known prior art stoichiometric neodymium laser material. However, surprisingly, in KNLF the nearest Nd-Nd intersite distance is roughly 29% greater than in neodymium pentaphosphate even with approximately equal neodymium concentrations. The properties of KNLF and neodymium pentaphosphate (NPP) are compared in the accompanying Table.

TABLE

| PROPERTY | NPP | KNLF |
|---|---|---|
| Space Group | $P2_1/c$ | Pnma |
| Nd site symmetry | 1 | m |
| Coordination | 8 | 8 |
| Maximum Nd concentration | $3.9 \times 10^{21}$ ions $cm^{-3}$ | $3.6 \times 10^{21}$ ions $cm^{-3}$ |
| Nearest Nd - Nd distance | 5.19 A | 6.73A |
| Luminescence Lifetime | 115 μsec. | 300 μsec. |
| Quenching Ratio | 2.78 | 1.60 |
| Main Emission Peak | 1.051 nm | 1.048 nm |

It is possible to vary the composition of KNLF by the substitution of a non-interfering ion for a portion of the neodymium. The substituting ion must be a trivalent metal ion of ionic radius close to that of $Nd^{3+}$ to avoid disturbing the lattice structure. Ionic radii between about 1.00 Å and 1.20 Å suffice for the modifying or diluting ion. Non-interfering trivalent ions of the rare earth elements of atomic numbers 57-64 are useful as diluting ions in KNLF, although lanthanum, cerium, and gadolinium are preferred.

The preparation of polycrystalline KNLF is described in Example I below, with a method for preparing the single crystal material illustrated in Example II. A series of laser materials according to the present invention having the composition $K_5Nd_xCe_{(1-x)}Li_2F_{10}$, where x ranges between 0.01 and 1.0, are prepared according to Examples III-VII. Examples VIII and IX illustrate the preparation of stoichiometric laser materials according to the present invention in which 99% of the neodymium sites in KNLF have been replaced with lanthanum or gadolinium ions. Examples III to IX clearly illustrate that laser materials having the formula $K_5Nd_xM_{(1-x)}Li_2F_{10}$ can be prepared in which M is cerium, lanthanum, or gadolinium, and x ranges from about 0.01 to 1, without disrupting the crystalline structure of the material.

The following Examples described the preparation and evaluation of stoichiometric laser media according to the present invention. Potassium fluoride and lithium fluoride used in the preparations were obtained 99.99% pure from United Mineral and Chemical Corp., 129 Hudson Street, New York, N.Y. Rare earth fluorides were obtained 99.99% pure from Research Chemicals, Box 14588, Phoenix, Az.

EXAMPLE I $K_5NdLi_2F_{10}$ was prepared by weighing 1.077 g (0.0185 mole) of potassium fluoride, 0.192 g (0.0074 mole) of lithium fluoride, and 0.721 g (0.0036 moles) of neodymium (III) fluoride. The potassium fluoride and lithium fluoride were in slight excess to accomodate slight volatilization losses during the subsequent heating steps.

The weighed materials were thoroughly ground and mixed and then placed in a small platinum ignition boat which in turn was placed in a larger alumina ceramic boat for mechanical support. All of the preceding steps were carried out in a dry, argon-filled glove box.

The ignition boat and its contents were quickly transferred from the glove box to a Monel reaction tube. The reaction tube was then flushed with argon overnight.

The sample contained in the reaction tube was subjected to the following sequence of heating and cooling steps while a gentle flow of argon was maintained through the reaction tube:

1. Heat sample to 800° C. for 1 hour
2. Heat sample to 900° C. for 1-1½ hours
3. Gradually cool sample to 600° C.
4. Lower temperature from 600° C. to 500° C. at a rate of about 12° C./hour
5. Lower temperature from 500° C. to 400° C. at a rate of about 30° C./hour
6. Cool sample quickly from 400° C. to room temperature.

The product of this treatment was transferred to the dry box and weighed. Less than 0.1 g of material had been lost by volatilization during the heating steps. The material had a melting point of 541° C. and was shown by analysis to have the chemical composition $K_5NdLi_2F_{10}$. The material was polycrystalline, although small single crystals approximately 0.1 mm × 1 mm × 1 mm were separated from the crystalline mass for evaluation as a laser medium.

EXAMPLE II

Single crystals of $K_5NdLi_2F_{10}$ were prepared according to the following method by the gradient freeze technique. Steps similar to those described in Example I were employed to exclude oxygen from sample during preparation.

A thoroughly ground and mixed charge consisting of 7.45 g (0.128 mole) of potassium fluoride, 1.34 g (0.052 mole) of lithium fluoride, and 5.18 g (0.026 mole) neodymium (III) fluoride was placed in a vitreous graphite crucible (Fluorocarbon Corp., 1432 So. Allec. St., Anaheim, CA). The crucible was lightly capped with a platinum foil plug, and placed within a quartz reaction tube. The quartz tube was in turn placed in a two zone heating furnace in such a manner that a temperature gradient of 50°-75° C./inch was maintained in the region of the sample crucible, with the lower temperature at the bottom of the crucible. The quartz reaction tube was fitted with connections so that a flow of dry argon was continually passed over the sample during the heating and cooling cycle, which was performed according to the following steps. The parenthetical temperature values are the lower temperatures at the bottom of the graphite crucible in each case.

1. Heat sample to 950° C. (850° C.) for 2-3 hours.

2. Gradually cool the sample to 775° C. (675° C.) and maintain at this temperature overnight to equilibrate the sample melt.
3. Allow the sample to cool to 500° C. (400° C.) at a rate of about 2½° C./hour.
4. Allow the sample to cool to room temperature.

The single crystal product was then extracted from the vitreous graphite crucible. Although mechanical fracture of the crystal is a problem at this step, single crystal sections in excess of 0.3 cm × 1 cm × 1 cm were obtained by this method.

EXAMPLE III

KNLF diluted with cerium ion was prepared by thoroughly grinding and mixing 1.077 g (0.0185 mole) of potassium fluoride, 0.192 g (0.0074 mole) of lithium fluoride, 0.705 g (0.0036 mole) of cerium (III) fluoride, and 0.026 g (0.00013 mole) of neodymium (III) fluoride.

The mixture was subjected to the same treatment as detailed in Example I. The final product weighed 1.99 g and had a composition corresponding to the formula $K_5Nd_{0.035}Ce_{0.965}Li_2F_{10}$.

EXAMPLES IV-VII

Using appropriately adjusted molar quantities of cerium (III) fluoride and neodymium (III) fluoride in the initial compositions, Examples IV, V, VI and VII were prepared having compositions corresponding to the formula $K_5Nd_xCe_{(1-x)}Li_2F_{10}$ where x was 0.01, 0.10, 0.25, and 0.50, respectively. The specific steps in each preparation followed those detailed in Example III above.

EXAMPLE VIII

KNLF diluted with lanthanum ion was prepared by thoroughly grinding and mixing 1.08 g (0.019 mole) of potassium fluoride, 0.19 g (0.007 mole) of lithium fluoride, 0.007 g ($3.5 \times 10^{-5}$ mole) of neodymium (III) fluoride, and 0.68 g (0.0035 mole) of lanthanum (III) fluoride. The mixed powder sample was treated to the same series of heating steps as outlined above in Example I.

From this process there were obtained 1.9 g of a polycrystalline product which had the composition $K_5Li_2Nd_{0.01}La_{0.99}F_{10}$.

EXAMPLE IX

KNLF diluted with gadolinium ion was prepared by thoroughly grinding and mixing 1.08 g (0.019 mole) of potassium fluoride, 0.19 g (0.007 mole) of lithium fluoride, 0.007 g ($3.5 \times 10^{-5}$ mole) of neodymium (III) fluoride, and 0.75 g (0.0035 mole) of gadolinium (III) fluoride. The mixed powder was subjected to the same series of heating steps as outlined above in Example I.

From this process there were obtained 1.9 g of a polycrystalline product which has the composition $K_5Nd_{0.01}Gd_{0.99}Li_2F_{10}$.

The emission spectrum and luminescence decay times of stoichiometric neodymium laser materials according to the present invention were experimentally determined using the apparatus schematically represented in FIG. 1. A polycrystalline sample 2 of KNLF was placed in a Dewar flask 4. The sample 2 as excited by a tunable coumarin 120 dye laser 6. The light emitted by sample 2 was passed through a ¾ meter Czerny-Turner spectrometer 8 (Jarrell-Ash Div., Fisher Scientific Co., 590 Lincoln Street, Waltham, MA 02154), and then to a Varian model VPM-159A cooled photomultiplier 10 (Varian Instrument Division, 611 Hansen Way, Palo Alto, CA 94303). The emission spectrum of the excited sample 2 was measured using an electrometer 14. Alternatively, the output of photomultiplier 10 was connected to a boxcar integrator 12 (Princeton Applied Research Corp., P. O. Box 2565, Princeton, NJ 08540) to measure the luminescence decay times of the excited sample 2, under conditions of pulsed excitation by dye laser 6.

Figure 4:
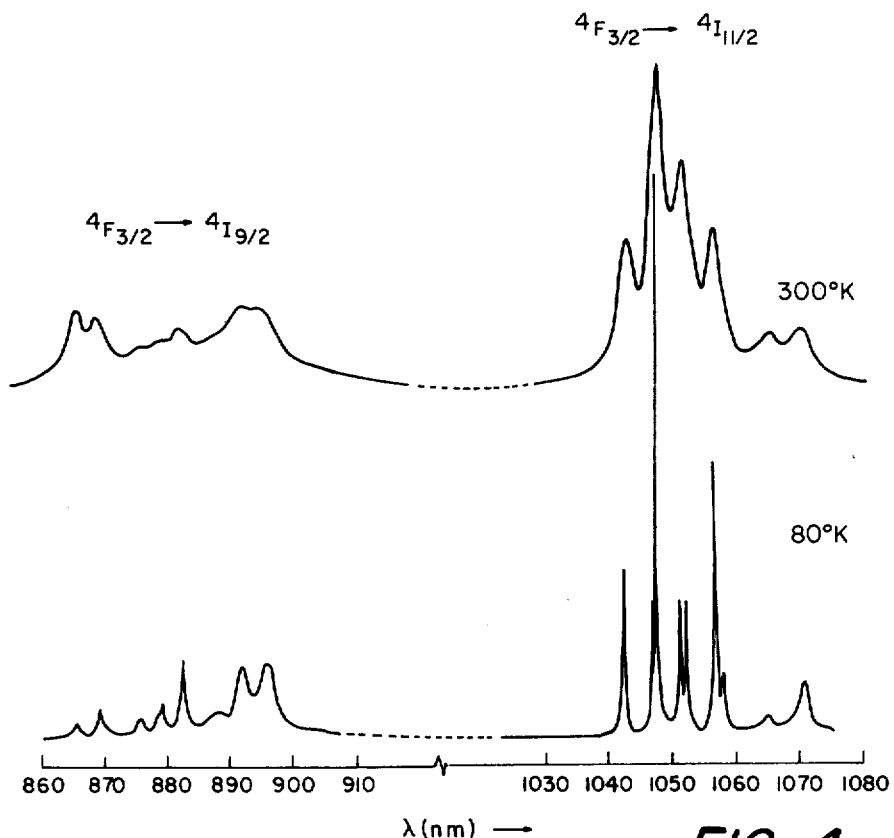
FIG. 4 shows emission spectra of laser media according to the present invention.

The emission spectra of KNLF at 80° K. and 300° K. are shown in FIG. 4. The primary emission band, corresponding to the $^4F_{3/2} \rightarrow ^4I_{11/2}$ transition appears at 1048 nanometers.

Figure 5:
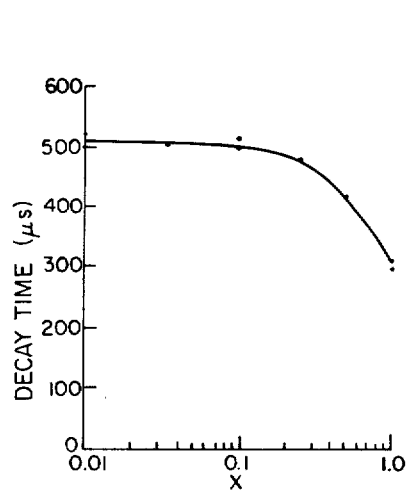
FIG. 5 shows the dependence of luminescence decay time upon neodymium concentration in $K_5NdLi_2F_{10}$ according to the present invention.

The luminescence decay times were determined at room temperature for the six laser samples of Examples I, and III-VII, and the results appear in FIG. 5. The Figure shows the expected fall-off of luminescence decay time with increasing neodymium ion concentration, but even for the most concentrated sample, the decay time is still about 300 μsec. This leads to a calculated quenching ratio of about 1.60 between the most dilute and most concentrated materials. This is a considerable improvement over neodymium pentaphosphate, the best known prior art stoichiometric neodymium laser material, which has a quenching ratio of 2.78 as shown in the preceding Table.

Figure 6:
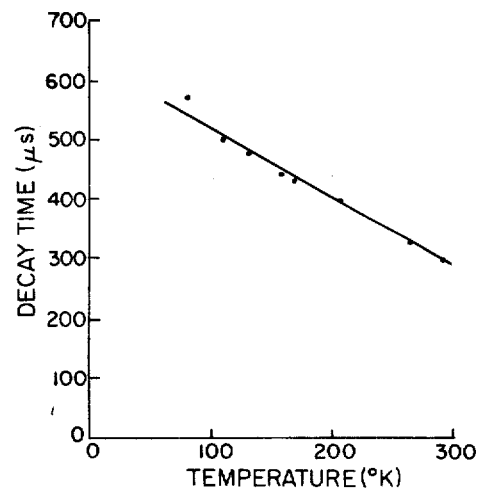
FIG. 6 shows the temperature dependence of luminescence decay time for $K_5NdLi_2F_{10}$ according to the present invention.

FIG. 6 shows a linear, and as yet unexplained decrease in luminescence decay time with increasing temperature for materials according to the present invention.

Figure 2:
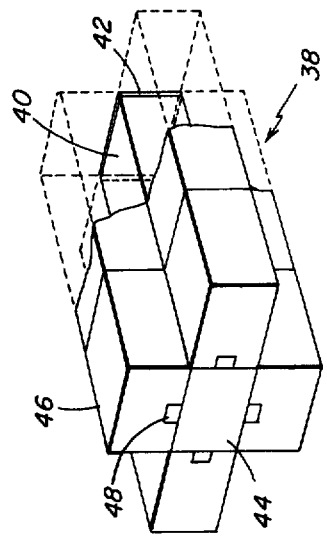
FIG. 2 is a schematic representation of the experimental arrangement employed to determine the laser properties of laser media according to the present invention.

Laser emission from KNLF was obtained using the apparatus represented schematically in FIG. 2. A small crystal 20 of KNLF measuring about 0.3 mm × 0.3 mm × 0.1 mm was mounted in an optical cavity 22 of a laser with the a axis of the crystal aligned with the lasing direction. The sample was placed at the laser mode waist of a nearly concentric 10 cm optical cavity 22 defined by a first spherical mirror 24 and a second spherical mirror 26. The mirrors were transparent to the pump radiation wavelength of 586 nanometers. Mirror 24 was totally reflective to the laser emission wavelengths, and mirror 26 transmitted approximately 0.2% of the laser emission wavelengths.

The crystal 20 was collinearly pumped by means of a tunable dye laser 28 which was chopped by a rotating chopper 30 to produce 500 millisecond pulses. The laser output was passed through a ¾ meter Czerny-Turner spectrometer 32 to a photomultiplier 34. The photomultiplier 34 output was measured using a PAR boxcar integrator 36.

Approximately 40% of the pump radiation was absorbed by the 0.1 mm thick sample, with a threshold of 1.4 mW for the 0.2% transmissive output mirror. With an output transmission of 1%, the threshold power increased to 2.1 mW, and a 19% slope power efficiency was measured. The effective cross-section for KNLF at a wavelength of 1048 nanometers is about $0.8 \times 10^{-19}$ cm². At higher pump levels, emission at 1052 nanometers was observed, polarized orthogonally to the 1048 nanometer emission.

With relatively long spontaneous fluorescent lifetimes, laser media according to the present invention are attractive media for miniature pulsed laser devices. Q-switched operation of such laser devices is enhanced by the efficient energy storage in laser media according to the present invention.

Minilasers are constructed according to the present invention by placing a single crystal of a stoichiometric neodymium laser material of the formula $K_5Li_2Nd_xM_{(1-x)}F_{10}$ in an optical resonating cavity defined by a first totally reflective mirror and a second mirror partially transmissive to the laser emission wavelength.

In the laser medium, the metal M is a diluting, non-interfering ion such as preferrably lanthanum, cerium, or gadolinium, but may be any trivalent rareearth ion of elements 57–64 having an ionic radius of between about 1.00 Å and 1.20 Å.

The value of x can range from about 0.01 to 1.0, with higher values of x preferred to maximize the concentration of neodymium ion in the lasing medium. A preferred stoichiometric neodymium laser medium of lasers according to this invention is $K_5Li_2NdF_{10}$ where x in the general formula above equals 1. In this material, the high concentration of lasing ion permits the construction of very small lasers with the laser medium comprising a single crystal of a few millimeters in dimension or less. The high neodymium concentration of neodymium ion enables the transverse pumping of the laser medium.

Figure 3:
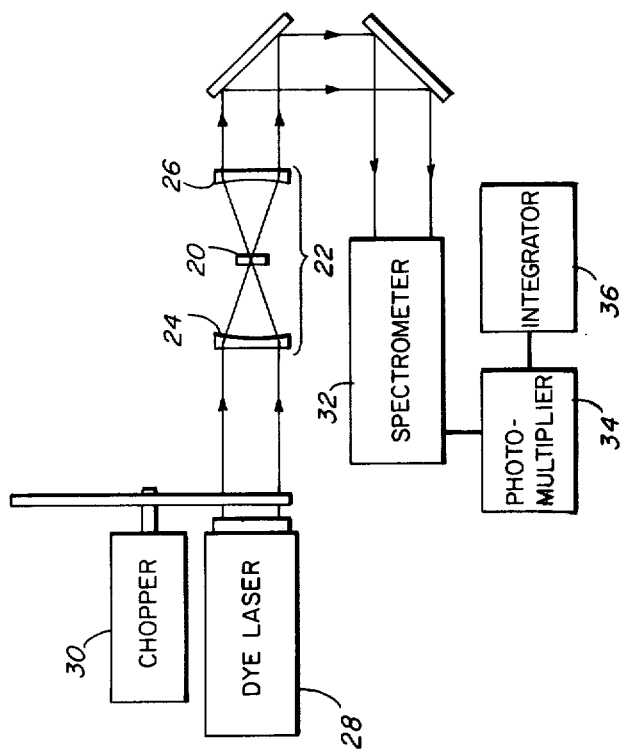
FIG. 3 is a schematic representation of a laser according to the present invention.

In one embodiment of the invention, shown in FIG. 3, the laser 38 comprises a single crystal 40 of laser material according to the present invention with a first totally reflective mirror 42 formed by coating one end of the crystal which is perpendicular to the lasing axis. A second partially transmissive mirror 44 is formed by coating the crystal face which opposes the first surface mirror 42. An array of light emitting diodes or laser diodes 46 are positioned adjacent to the crystal in such a way that the light emitting junction 48 of each diode is in good optical contact with the crystal 40 and aligned parallel to the crystal lasing axis. For simplicity in FIG. 2, the electrical connections to each light emitting diode and the associated electrical circuitry required for energization of the light emitting diodes are not shown.

The luminescence decay times of stoichiometric neodymium laser media according to the present invention are sufficiently long to permit storage within the crystal of pump radiation energy. This property enables the construction of Q-switched or pulsed lasers employing laser media of single crystals of materials according to the present invention. In a pulsed laser embodiment, the source of optical pumping energy takes the form of a flashlamp disposed adjacent to the optical cavity.

Q-switched lasers using laser media of the present invention comprise the laser medium, disposed in an optical cavity formed by a first totally reflective mirror and a second partially reflective mirror, and an optical pumping means for exciting the medium to emit stimulated radiation, and a Q-switch means disposed in the optical cavity for interrupting the optical energy beam in the cavity.

While there has been shown and described what is at present considered to be the preferred embodiment of the invention, it will be obvious to those skilled in the art that various changes and modifications may be made therein without departing from the scope of the invention as defined by the appended claims.

What is claimed is:

1. An active laser medium comprising a stoichiometric single crystal compound of the general formula:

$$K_5Nd_xM_{(1-x)}Li_2F_{10} \quad (0 < x \leq 1)$$

where M is a metal selected from the group consisting of lanthanum, cerium, and gadolinium.

2. The active laser medium of claim 1 wherein $0.01 \leq x < 1$.

3. The active laser medium of claim 2 wherein M is lanthanum.

4. The active laser medium of claim 2 wherein M is cerium.

5. The active laser medium of claim 2 wherein M is gadolinium.

6. An active laser medium consisting of a stoichiometric single crystal compound of the formula $K_5NdLi_2F_{10}$ characterized by a temperature dependent luminescence lifetime having a value of about 300 microseconds at room temperature.

7. A laser comprising in combination:
an optical resonance cavity defined by a first totally reflective mirror and a second partially transmissive mirror,
an active laser medium within said cavity, said medium comprising a stoichiometric single crystal compound of the general formula $$K_5Nd_xM_{(1-x)}Li_2F_{10} (0 < x \leq 1)$$

wherein M is a metal selected from the group consisting of lanthanum, cerium, and gadolinium, and
an optical pumping means disposed adjacent to said optical cavity for exciting said laser medium to emit stimulated radiation.

8. The laser according to claim 7 wherein $0.01 \leq x < 1$.

9. The laser according to claim 8 wherein M is lanthanum.

10. The laser according to claim 8 wherein M is cerium.

11. The laser according to claim 8 wherein M is gadolinium.

12. The laser according to claim 7 wherein said active laser medium consists of $K_5NdLi_2F_{10}$.

13. The laser according to claim 7 wherein said optical pumping means comprises at least one light emitting diode.

14. The laser according to claim 7 wherein said optical pumping means comprises at least one laser diode.

15. The laser according to claim 7 wherein said first totally reflective mirror and said second partially transmissive mirror comprise reflective coatings on opposite surfaces of said active laser medium.

* * * * *